US006927361B2

(12) United States Patent
Kelly et al.

(10) Patent No.: US 6,927,361 B2
(45) Date of Patent: Aug. 9, 2005

(54) SURFACE OXIDE WELD PENETRATION ENHANCEMENT METHOD AND ARTICLE

(76) Inventors: Thomas Joseph Kelly, 10185 Bennington Dr., Cincinnati, OH (US) 45241; Samuel Frank Mastrorocco, 6546 Cedar Ridge Dr., Loveland, OH (US) 45140; Earl Claude Helder, 6744 Kenwood Rd., Cincinnati, OH (US) 45243; Eva Z. Lanman, 5694 Whistling Wind, Milford, OH (US) 45150; Vallerie Althea McGee, 1046 Elda La., Cincinnati, OH (US) 45224

( * ) Notice: Subject to any disclaimer, the term of this patent is extended or adjusted under 35 U.S.C. 154(b) by 66 days.

(21) Appl. No.: 10/655,284

(22) Filed: Sep. 4, 2003

(65) Prior Publication Data

US 2005/0051527 A1   Mar. 10, 2005

(51) Int. Cl.$^7$ ............................................. B23K 9/00
(52) U.S. Cl. .......................... 219/137 WM; 219/137 R
(58) Field of Search ............................... 219/137 WM, 219/137 R, 136

(56) References Cited

U.S. PATENT DOCUMENTS

| | | | | |
|---|---|---|---|---|
| 2,498,275 | A | * | 2/1950 | Johnson ..................... 29/889.6 |
| 3,617,685 | A | | 11/1971 | Brill-Edwards et al. |
| 4,176,433 | A | | 12/1979 | Lee et al. |
| 4,205,118 | A | | 5/1980 | Schubert |
| 4,288,677 | A | | 9/1981 | Sakata et al. |
| 4,611,744 | A | | 9/1986 | Fraser et al. |
| 4,726,104 | A | | 2/1988 | Foster et al. |
| 5,320,879 | A | * | 6/1994 | Bullock ...................... 427/576 |

(Continued)

FOREIGN PATENT DOCUMENTS

| | | |
|---|---|---|
| EP | 1 016 487 A2 | 7/2000 |
| EP | 1 110 658 A2 | 6/2001 |
| WO | WO 01/41970 A1 | 6/2001 |

Primary Examiner—M. Alexandra Elve
(74) Attorney, Agent, or Firm—McNees, Wallace & Nurick LLC

(57) ABSTRACT

A method for welding iron-based or nickel-based superalloy assemblies into a unitary article. First, the assemblies are heated in an air atmosphere, at a rate suitable to minimize geometric distortion, to a temperature in the range of about 1400F (760C) to about 2000° F. (1090° C.) to form an oxide layer on the surface of the assemblies and optionally as a pre-weld solution heat treat. The temperature of the assemblies are then held in a range of about 1400F (760C) to about 2000° F. (1090° C.) for a time sufficient to form an oxide layer of sufficient thickness on the surface of the assemblies and optionally to solution the assemblies. The assemblies are then cooled to ambient temperature at a rate sufficient to avoid precipitation of unwanted metal phases at a rate sufficient to maintain dimensional stability. The oxide layer is then removed from at least the faying surfaces of the assemblies, but not from the face side of the assemblies. The faying surfaces of the assemblies are then cleaned. The assemblies are then welded using a GTA welding procedure to form a unitary article. The article is then resolutioned at an appropriate temperature for an appropriate period of time, both of which are dependent on the type of superalloy(s) that is present in the welded article and the desired properties. The article is then optionally age heat treated at an appropriate temperature for an appropriate period of time, both of which are dependent on the type of superalloy(s) that is present in the welded unitary article.

34 Claims, 2 Drawing Sheets

U.S. PATENT DOCUMENTS

| | | |
|---|---|---|
| 5,813,118 A | 9/1998 | Roedl et al. |
| 5,897,801 A | 4/1999 | Smashey et al. |
| 5,972,424 A | 10/1999 | Draghi et al. |
| 6,054,687 A | 4/2000 | Conner et al. |
| 6,077,615 A | 6/2000 | Yada et al. |
| 6,124,568 A | 9/2000 | Broderick et al. |
| 6,154,959 A | 12/2000 | Goodwater et al. |
| 6,173,491 B1 | 1/2001 | Goodwater et al. |
| 6,233,822 B1 | 5/2001 | Grossklaus, Jr. et al. |
| 6,465,755 B2 | 10/2002 | Hughes et al. |
| 6,489,583 B1 | 12/2002 | Feng et al. |
| 6,610,962 B1 * | 8/2003 | Warren et al. .............. 219/136 |

* cited by examiner

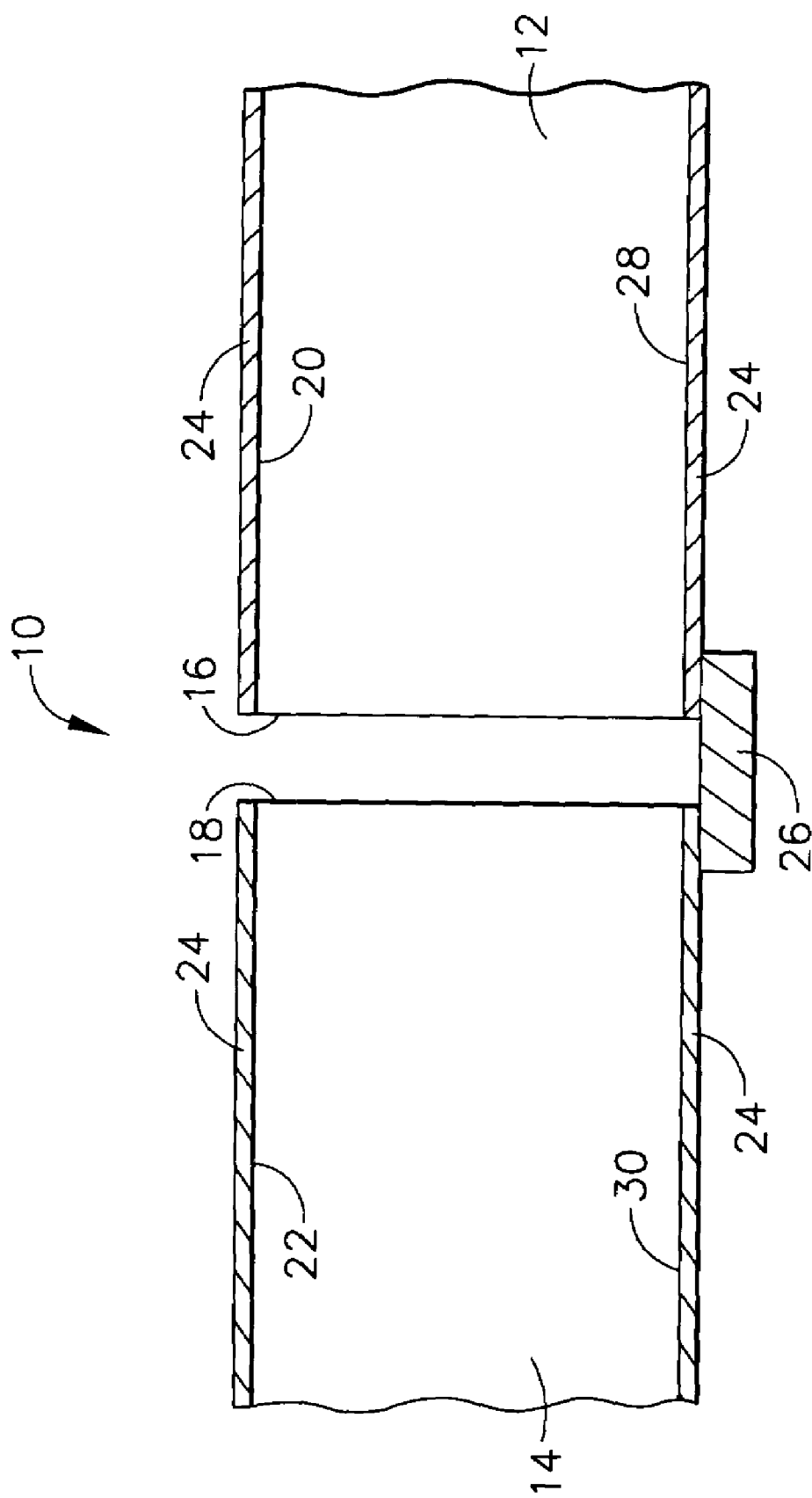

SURFACE OXIDE WELD PENETRATION ENHANCEMENT METHOD AND ARTICLE

FIELD OF THE INVENTION

This invention relates to an apparatus and method for welding nickel-base and iron-base superalloy components and to nickel-base and iron-base superalloy components manufactured using the method of the present invention. More particularly, this invention is directed to a welding operation that involves an oxidative heat treatment step and articles produced thereby.

BACKGROUND OF THE INVENTION

Iron-based and nickel-based superalloys are widely used to form certain components of gas turbine engines, and other turbine engines, including structural components, combustors and turbine airfoils such as vanes and blades. While high-temperature superalloy components are often formed by casting, circumstances exist where superalloy components are preferably fabricated or are required to be fabricated by welding separate assemblies. For example, components having complex configurations, such as turbine midframes and shroud support rings, can be more readily fabricated by welding separate cast or wrought forms together. Therefore, it is often more practical and cost effective to fabricate complex components by welding together individual assemblies rather than casting or forging the component as a unitary article. The welding procedures are very labor intensive, time consuming, and expensive, particularly when the pre-weld solution process required to prepare the article for welding must be performed in a vacuum.

GTA welding processes are generally often used to weld nickel-based and iron-based superalloy assemblies. The wide weld area causes significant distortion and a relatively large heat affected zone volume.

Recent advancements in penetration enhancement technology for flux-assisted GTA welding have produced a flux material that permits the use of gas tungsten arc (GTA) welds to join material thickness greater than about 0.1 inch in a single pass with a square butt preparation; this processing has been used in place of electron beam (EB) welding for nickel-base and iron-base superalloys. In addition, the same processing has been used to weld thinner sections but with significantly reduced heat input as compared with conventional GTA processing. A proprietary weld flux has recently been created, known as FASTIG SS-7™, which is owned by Edison Welding Institute, comprising blended solid powders mixed into a carrier such as methyl ethyl ketone (MEK), such blended powders comprising NiO, $Ti_2O_3$, $TiO_2$, TiO and a manganese silicate compound. FASTIG SS-7™ contains a plurality of different metal oxides and is applied to the face side of articles to be welded in the form of a paste. When the flux is applied to the face side of nickel-base or iron-base superalloy substrates and a GTA process is used to weld the substrates, a much deeper and narrower weld is created than is normally created with a GTA process. However, the use of a flux such as FASTIG SS-7™ is tedious to apply and adds additional product costs to the superalloy substrate welding process. In addition, when a flux such as FASTIG SS-7™ is used, the flux may accidentally be applied to the faying surfaces, which causes the GTA process to fail.

There is accordingly a need for an improved technique for welding articles made of nickel-base and iron-based superalloys. The present invention fulfills this need, and further provides related advantages.

SUMMARY OF THE INVENTION

The present invention is directed toward improvements in the welding processes used to fabricate and restore gas turbine engine and other turbine engine components and parts to provide a less expensive and higher quality GTA weld. The process of the present invention permits the use of a GTA weld process as a substitute for an EB weld process.

The present invention generally provides a method for welding a superalloy article comprising at least two assemblies. The nickel-based or iron-based assemblies are welded together to form a unitary article through a process that first includes the formation of an adherent oxide layer on the surface of the assembly substrates that are to be joined. First, the assemblies are heated in an air atmosphere, at a rate suitable to minimize geometric distortion, to a temperature in the range of about 1400° F. (760° C.) to about 2000° F. (1090° C.) to form an adherent oxide layer on the surface of the assemblies that are to be joined. This heating step optionally may also serve as a pre-weld solution heat treatment. The temperature is held in a range of about 1400° F. (760° C.) to about 2000° F. (1090° C.) for a time sufficient to solution the assemblies and to form an oxide layer of sufficient thickness on the surface of the assemblies to modify fluid flow in a subsequent GTA weld pool. The assemblies are then cooled to ambient temperature at a rate sufficient to avoid both precipitation of unwanted metal phases and to maintain dimensional stability. The oxide layer is then removed from at least the faying surfaces of the assemblies to be joined, but not from the face sides of the assemblies. The assemblies are then welded together to form a unitary article using a GTA welding procedure. The articles is then heat treated at an appropriate temperature for an appropriate period of time, both of which are dependent on the type of superalloy(s) that is present in the welded article and the properties desired. The articles may then optionally be aged at an appropriate temperature for an appropriate period of time, both of which are dependent on the type of superalloy(s) that is present in the welded article and the properties desired. As used herein, the term "faying surface" means the abutting or adjacent surfaces of assembles that are to be welded, which form a pre-weld welding joint when placed together, the weld joint being formed substantially parallel to these adjacent surfaces.

An advantage of the method of the present invention is that lower energy GTA welds may be used in place of higher energy GTA welds, resulting in a less expensive welding process and manufacturing processing than without the use of a welding flux.

Another advantage of the method of the present invention is that GTA welds may be used in place of EB welds, resulting in a less expensive welding process.

Another advantage of the method of the present invention is that the pre-weld solution heat treatment and oxidation does not need to be carried out in a more expensive vacuum, neutral, or protective atmosphere. The substantial portion of the clean-up of the weld joint is reduced to the faying surface, while the face sides only require clean-up to remove loose residue, dirt and grease.

Another advantage of the method of the present invention that the GTA welds associated with the present invention result in lower geometric distortion and significantly less heat affected zone volume than a typical GTA weld.

Other features and advantages of the present invention will be apparent from the following more detailed description of the preferred embodiment, taken in conjunction with the accompanying drawings which illustrate, by way of example, the principles of the invention.

BRIEF DESCRIPTION OF THE DRAWINGS

FIG. 2 is an embodiment of a square butt joint of the present invention.

DETAILED DESCRIPTION OF THE INVENTION

Figure 1:
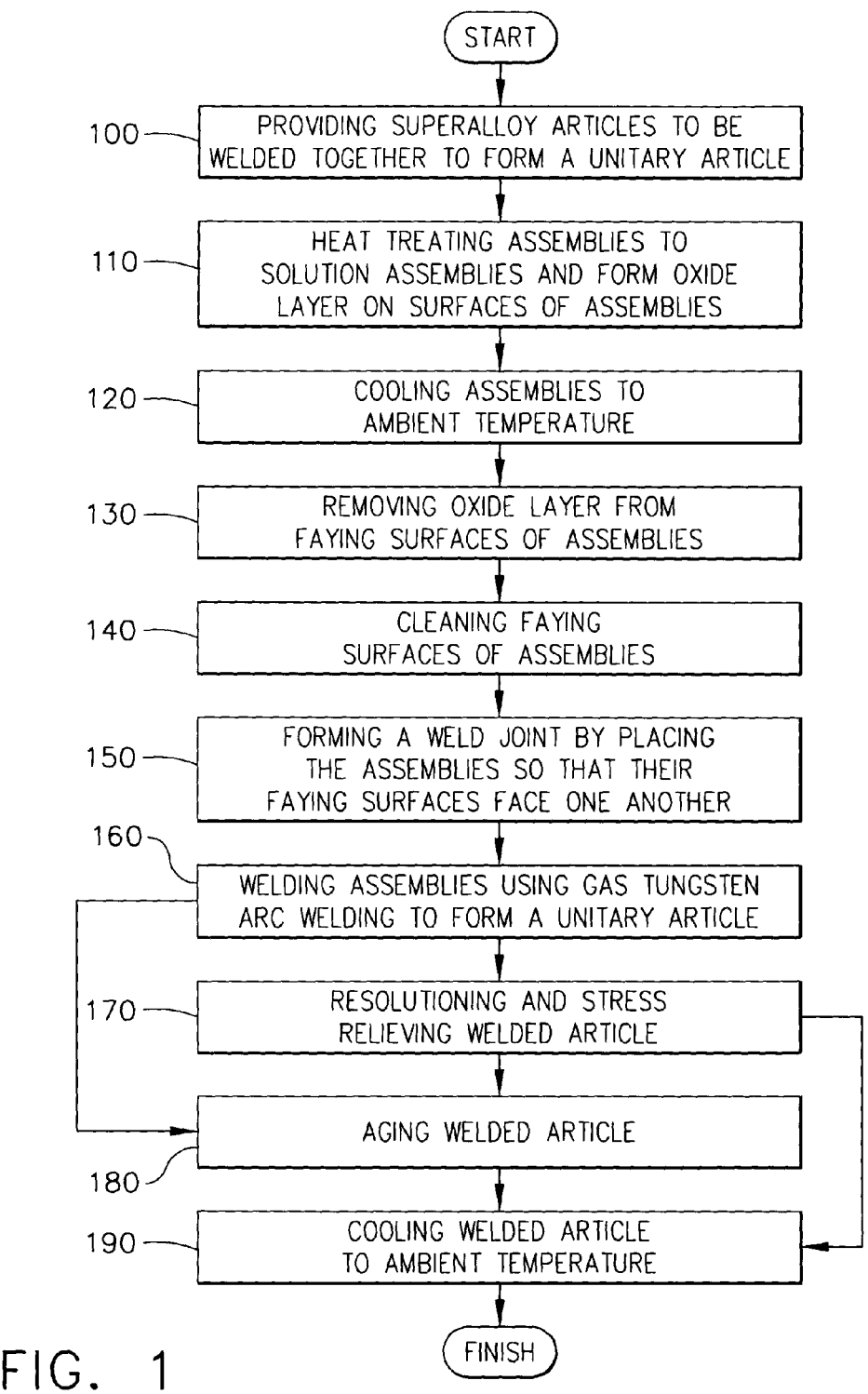
FIG. 1 is a process flow chart illustrating a process by which a superalloy substrate is welded using gas tungsten arc welding.

Referring now to FIG. 1 there is shown a flow chart of the method of the present invention as applied to welding together nickel-based or iron-based (or combination thereof) superalloy articles to form a single nickel-based or iron-based (or combination thereof) article. The iron-based superalloy article(s) preferably comprises at least about 18 weight percent chromium and at least about 8 weight percent nickel. The nickel-based superalloy article(s) preferably comprises at least about 50 weight percent nickel and at least about 12 weight percent chromium. The first step of the process 100 is the provision of at least two superalloy assemblies to be welded together. The assemblies may be iron-based superalloys, nickel-based superalloys or combinations thereof. Preferably, however, the composition of the assemblies are of the same or similar materials to avoid problems associated with dissimilar metal welds. Put another way, preferably nickel-based superalloy compositions are welded to nickel-based superalloy compositions and iron-based superalloy compositions are welded to iron-based superalloy compositions. In a preferred embodiment, the assemblies are newly manufactured. In a more preferred embodiment, each assembly comprises the well-known nickel-base superalloy INCONEL® 718. INCONEL® is a trademark of Huntington Alloys Corporation of Huntington, W. Va. In another alternative embodiment, the assemblies are repaired castings. In an alternative embodiment, each assembly comprises cast INCONEL® 718. In another alternative embodiment, each assembly comprises wrought INCONEL® 718. The compositions of both cast INCONEL® 718 and wrought INCONEL® 718 are well known in the art. INCONEL® 718 is a designation for an alloy comprising about 19 weight percent iron, about 18 weight percent chromium, about 5 weight percent tantalum and niobium, about 3 weight percent molybdenum, about 0.9 weight percent titanium, about 0.5 weight percent aluminum, about 0.05 weight percent carbon, about 0.009 weight percent boron, a maximum of about 1 weight percent cobalt, a maximum of about 0.35 weight percent manganese, a maximum of about 0.35 weight percent silicon, a maximum of about 0.1 weight percent copper, and the balance being nickel. In an alternative embodiment, one assembly is a repaired cast assembly and a second assembly is newly manufactured or alternatively repaired forging. In a more preferred embodiment, one assembly comprises repaired cast INCONEL® 718 and a second assembly comprises wrought INCONEL® 718. The next step of the process 110 is an oxidative heat treatment of the assemblies in order to form an oxide layer on the outer surface of the assemblies, to optionally solution the assemblies to relieve stresses in the assemblies, and to optionally place in solution the appropriate precipitates in the assemblies. The assemblies are heated in an oxygen-containing atmosphere, preferably air, at a rate suitable to minimize geometric distortion, to a temperature in the range of about 1400° F. (760° C.) to about 2000° F. (1090° C.) to form an oxide layer on the surface of the article and as a pre-weld solution heat treatment. The temperature of the assemblies is then held in a range of about 1400° F. (760° C.) to about 2000° F. (1090° C.) for a preselected period of time in the range of about 0.25 hour to about one hour to form an oxide layer of sufficient thickness on the surface of the assemblies to modify fluid flow of the molten metal during a subsequent GTA welding procedure, to optionally solution the assemblies, and to optionally relieve stresses in the assemblies. In a preferred embodiment, the oxide layer will be in the range of about 0.0005 inch thick to about 0.005 inch thick. In a most preferred embodiment, the temperature of the assemblies is held at about 1750° F. for about one hour. Depending on the nature, size, and irregularities and the properties to be achieved for the assemblies to be joined together by welding, the pre-weld heat treatment including temperature and hold times may be different for each assembly. The composition of the oxide layer is dependent on the composition of the underlying substrate. Such oxide formation is known in the art. The next step of the process 120 is cooling the assemblies to ambient temperature at a rate sufficient to avoid precipitation of unwanted metallurgical phases and at an appropriate rate sufficient to maintain dimensional stability.

The next step of the process 130 is removing the oxide layer from the faying surfaces of the assemblies. Alternatively, the oxide layer can be prevented from forming on the faying surfaces, such as by masking the faying surfaces. The masking can then be removed after the oxidation of the face sides. Optionally, the oxide layer may be removed from all portions of the assemblies except for the face side. The present invention does not require an oxide layer to be present on the root side of the assemblies in what will form the weld root. The oxide layer on the faying surfaces may be removed by any appropriate method such as by grinding or wire brushing off the oxide layer. The oxide layer should be removed from all surfaces of the article after welding in accordance with the present invention. The oxide layer may be removed by machining the newly welded article or during the final cleaning of the article, depending on the nature of the article. The next step of the process 140 is cleaning the faying surfaces of the assemblies with an appropriate cleaning agent to remove any remaining contaminations.

The next step of the process 150 is forming a weld joint by placing the assemblies so that their substantially oxide-free faying surfaces are opposed as to abut or form a small gap therebetween. The next step of the process 160 is welding the articles using a GTA welding procedure. The welding is preferably performed by mechanically fastening the articles together and by striking an arc in a preselected area where the articles meet so as to locally melt the superalloy in the preselected area so that the articles are fused together into a unitary article. A backing strip may be utilized as required. GTA welding is performed in accordance with well-known procedures. In a preferred embodiment, the weld is a weld formed without filler material, which is commonly known as an autogenous weld.

In an alternative embodiment, the GTA welding process uses filler material to join the assemblies. A filler material that is compatible with the base metal of the assemblies must be selected. For the thinner joints in the range of up to about 0.180 inch thick, only one GTA weld pass is required.

In a preferred embodiment, the assemblies are welded at a square butt joint with a thickness in the range of about 0.125 inch to about 0.5 inch. In a most preferred embodiment, the square butt joint has a thickness in the range of about 0.25 inch to about 0.375 inch thick. Such a butt joint 10 is shown in FIG. 2. As shown in FIG. 2, two superalloy assemblies 12, 14 are placed adjacent to one another with their faying surfaces 16, 18 facing each other. The top or face side surfaces 20, 22 include a thin oxide layer 24. However, the faying surfaces 16, 18 are substantially oxide free, such as by removal of any oxide that may have been formed on them. The removal of such oxide may be accomplished mechanically, as by grinding or other process known in the art. A backing strip 26 is provided where the weld root will be formed, and the back sides 28, 30 of the assemblies also include a thin oxide layer 24. Optionally, the thin oxide layer 24 on the back sides 28, 30 of the assemblies may be removed prior to welding. It will be understood that other weld joint configurations such as V-joints, double V-joints, U-joints, etc., all well known in the art, may also be used. In another preferred embodiment, the assemblies are welded at a square butt joint having a thickness of about 0.125 to about 0.18 inch and require one pass of the GTA welder to adequately weld the assemblies together.

The presence of the oxide film on the surface of the superalloy assemblies alters the well-known dynamics of the GTA welding process. Instead of the GTA process creating a relatively wide and shallow weld pool, the GTA weld pool created by the method of the present invention is relatively narrow, and penetrates deeper into the metal thickness, creating a weld metal zone with a greater depth to width ratio than normally obtained with conventional GTA processing. The present invention decrease the width of the weld pool by about 30 percent when compared to the GTA weld pool of a weld made on assemblies that do not have an oxide coating. The weld pool is narrowed due to a reversal of fluid flow that drives the hottest fluid down through the center of the weld. The GTA weld in conjunction with the oxide layer on the assemblies achieves adequate penetration to replace EB welding in some applications. Unlike the electron weld process, the GTA weld process does not require a vacuum environment during welding the assemblies, since the GTA welding process of the present invention requires an oxide layer on the surface of the assemblies. Holding all other weld parameters constant, the present invention reduces the amount of amperage required for the GTA welding from about 33 percent to about 50 percent lower than GTA welding that is performed on assemblies that do not have an oxide layer. GTA welding techniques and EB welding techniques are known in the art.

The next step of the process 170 is resolutioning and stress relieving, or direct aging, the welded article in a protective atmosphere at an appropriate preselected temperature for an appropriate preselected period of time, both the time and temperature being dependent on the type of superalloy(s) that is present in the welded article and the desired properties. Such times and temperatures are well known in the art. The optional next step of the process 180 is an aging treatment in a protective atmosphere at an appropriate preselected temperature for an appropriate preselected period of time, both the time and temperature being dependent on the type of superalloy(s) that is present in the welded article and the type of microstructure required to be developed by the treatment, and the desired properties. The final step of the process 190 is cooling the article to ambient temperature.

EXAMPLE 1

As a first example of the present invention, illustrating the capability of the present invention to reduce weld heat input, a GTA weld of 0.060 inch thick nickel based or iron based materials performed in conjunction with the process of the present invention requires a current in the range of 40 to 50 amps (or about 33% less current than conventional processing) and a typical voltage in the range of about 7 to about 10 volts and a rate of welding in the range of 4 to 6 inches per minute to achieve a full penetration weld in a single pass.

A second example, similarly illustrating the capability of this invention to reduce heat input, a GTA weld of 0.090" thick nickel based or iron based materials performed in conjunction with the process of the present invention requires a current in the range of about 65 to 85 amps (or about 33% less current than conventional processing) with a voltage in the range of about 7 to 10 volts and a rate of welding of about 4 to 6 inches per minute to achieve a full penetration weld in one pass.

Welding according to the present approach has been described in terms of welding together different assemblies. However the process of the present invention may also be used to weld repair an article. The same steps as described previously are preferably used for the weld repair an article or articles having an area needing repair and having at least two faying surfaces and at least two face sides. Or the process may be used to for repair of shrinkage or other casting defects in cast components without excessive mechanical removal of material in preparation for the weld repair. In addition, a filler material of compatible material may be used to fill cracks in the article. The process of the present invention does not form any visible slag on the surface of the article, although some oxides may form during the welding, creating discoloration and forming and/or depositing non-continuous oxide particles on the face side of the welded article. Such oxide particles would be removed from the welded article during the mechanical cleaning process of welded article that is routinely performed after welding to remove discoloration as known in the art. If such oxide particles are left on the surface of the welded article, corrosion or moisture absorption into the oxide particles could cause additional corrosion to occur. However, post-welding cleaning is typically performed on all welds.

Numerous types of gas turbine and other turbine engine components may be manufactured or repaired using the method of the present invention. Such components include turbine midframes, turbine shroud support rings, combustors, centerbodies and flameholders.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A welding process for an aircraft engine article comprising the steps of:
providing at least two assemblies to be welded together to form a unitary article, said assemblies each having a faying surface and a face side, said assemblies each comprising a superalloy selected from the group consisting of iron-based superalloys and nickel-based superalloys;
heating the assemblies in an oxidative atmosphere, at a rate to minimize distortion of the assemblies, to a temperature in a range of about 1400° F. to about 2000° F.;
holding the assemblies at a temperature in the range of about 1400° F. to about 2000° F. for a preselected time sufficient to form an oxide layer of a preselected thickness on at least the face side of the assemblies;
cooling the assemblies to ambient temperature;
providing at least the faying surfaces of the assemblies substantially free of an oxide layer, while providing the face sides of the assemblies with an oxide layer of a preselected thickness range;
forming a weld joint by placing the assemblies so that their faying surfaces are opposed;
welding the assemblies using a gas tungsten arc process to form a unitary article;
resolutioning and stress relieving the article in a non-oxidative atmosphere to relieve stress in the article; and
cooling the article to ambient temperature.

2. The method of claim 1, wherein the step of holding the assemblies at a temperature in the range of about 1400° F. to about 2000° F. for a preselected time sufficient to form an oxide layer of a preselected thickness on at least the face side of the assemblies is also sufficient to solution the assemblies.

3. The method of claim 1, further comprising the step of aging the article in a protected atmosphere after the step of resolutioning and stress relieving.

4. The method of claim 1, wherein the iron-based superalloys comprise a chromium percent composition of at least about 18 percent by weight and a nickel composition of at least about 8 percent by weight and the nickel-based superalloys comprise a nickel percent composition of at least about 50 percent by weight and a chromium composition of at least about 12 percent by weight.

5. The method of claim 1, wherein two iron-base superalloy assemblies are provided and welded together.

6. The method of claim 1, wherein two nickel-base superalloy assemblies are provided and welded together.

7. The method of claim 1, wherein two assemblies comprised of an alloy with about 19 weight percent iron, about 18 weight percent chromium, about 5 weight percent tantalum and niobium, about 3 weight percent molybdenum, about 0.9 weight percent titanium, about 0.5 weight percent aluminum, about 0.05 weight percent carbon, about 0.009 weight percent boron, a maximum of about 1 weight percent cobalt, a maximum of about 0.35 weight percent manganese, a maximum of about 0.35 weight percent silicon, a maximum of about 0.1 weight percent copper and the balance being nickel are provided and welded together.

8. The method of claim 1, wherein a first superalloy assembly is welded to a second superalloy assembly using a square butt joint having a thickness of 0.125 inch to about 0.5 inch.

9. The method of claim 1, wherein the thickness of the square butt joint is about 0.25 inch to about 0.375 inch.

10. The method of claim 8, wherein a first assembly is welded to a second assembly using a square butt joint having a thickness in the range of about 0.125 inch to about 0.18 inch using one pass of the gas tungsten arc welder.

11. The method of claim 1, wherein the step of providing the faying surfaces of the assemblies substantially free of an oxide layer further includes removing the oxide layer formed during the temperature holding step.

12. The method of claim 11, wherein the removal is accomplished by grinding off the oxide layer.

13. The method of claim 1, wherein the step of providing the faying surfaces of the assemblies substantially free of an oxide layer further includes the steps of:
prior to the step of heating the assemblies in an oxidative atmosphere, masking the faying surfaces with a masking material; and
following the heating step, removing the masking material from the faying surfaces.

14. The method of claim 5, wherein an iron-based superalloy assembly is welded to a second iron-based superalloy assembly using a square butt joint having a width of 0.125 inch to about 0.5 inch.

15. The method of claim 6, wherein a first nickel-based superalloy assembly is welded to a second nickel-based superalloy assembly using a square butt joint having a width of 0.125 inch to about 0.5 inch.

16. The method of claim 14, wherein the width of the square butt joint is about 0.25 inch to about 0.375 inch.

17. The method of claim 14, wherein a first nickel-based superalloy assembly is welded to a second nickel-based superalloy assembly using a square butt joint having a width in the range of about 0.125 inch to about 0.18 inch using one pass of the gas tungsten arc weld.

18. The method of claim 5, wherein the oxide layer is removed from at least the faying surfaces by grinding.

19. The method of claim 7, wherein a first assembly is welded to a second assembly using a square butt joint having a width of 0.125 inch to about 0.5 inch.

20. The method of claim 19, wherein the width of the square butt joint is about 0.25 inch to about 0.375 inch.

21. The method of claim 19, wherein an article is welded to a second article at a square butt joint having a width in the range of about 0.125 inch to about 0.18 inch using one pass of the gas tungsten arc.

22. The method of claim 7, wherein the step of providing the faying surfaces of the assemblies substantially free of an oxide layer further includes removing the oxide layer formed during the temperature holding step.

23. The method of claim 22, wherein the removal is accomplished by grinding off the oxide layer.

24. A turbine midframe welded with the process of claim 3.

25. A turbine shroud support ring welded with the process of claim 3.

26. A welding process for an aircraft engine article comprising the steps of:
providing at least two assemblies to be welded together to form a unitary article, said assemblies each having a faying surface and a face side, said assemblies each comprising a superalloy selected from the group consisting of iron-based superalloys and nickel-based superalloys;
heating the assemblies in an oxidative atmosphere, at a rate to minimize distortion of the assemblies, to a temperature in a range of about 1400° F. to about 2000° F.;
holding the assemblies at a temperature in the range of about 1400° F. to about 2000° F. for a preselected time sufficient to form an oxide layer of a preselected thickness on at least the face side of the assemblies;

cooling the assemblies to ambient temperature;

providing at least the faying surfaces of the assemblies substantially free of an oxide layer, while providing the face sides of the assemblies with an oxide layer of a preselected thickness range;

forming a weld joint by placing the assemblies so that their faying surfaces are opposed;

welding the assemblies using a gas tungsten arc process to form a unitary article;

direct aging the article in a protected atmosphere; and cooling the article to ambient temperature.

27. The welding process of step 26 wherein the step of holding the assemblies at a temperature in the range of about 1400° F. to about 2000° F. for a preselected time sufficient to form an oxide layer of a preselected thickness on at least the face side of the assemblies is also sufficient to solution the assemblies.

28. A method of repairing a superalloy article using a gas tungsten arc welding process, comprising the steps of:

providing a superalloy article to be repaired by welding that includes the element of chromium and nickel, said article having an area needing repair, said area needing repair having at least two opposing faying surfaces and at least two face surfaces;

heating the article in an oxidative atmosphere, at a rate to minimize distortion of the article, to a temperature in a range of about 1400° F. to about 2000° F.;

holding the article at a temperature in the range of about 1400° F. to about 2000° F. for a preselected time sufficient to form an oxide layer of a preselected thickness on at least the face sides of the article;

cooling the article to ambient temperature;

providing at least the faying surfaces of the article substantially free of an oxide layer, while providing the face sides of the article with an oxide layer of a preselected thickness;

welding the article using a gas tungsten arc process to repair the article;

resolutioning and stress relieving the article in a non-oxidative atmosphere to relieve stress in the article; and cooling the article to ambient temperature.

29. The method of claim 18, wherein the step of holding the article at a temperature in the range of about 1400° F. to about 2000° F. for a preselected time sufficient to form an oxide layer of a preselected thickness on at least the face sides of the article is also sufficient to solution the assemblies.

30. The method of claim 28 further comprising the step of aging the article in a protected atmosphere after the step of resolutioning and stress relieving.

31. The method of claim 28, wherein the step of welding further includes the addition of a filler material of a composition compatible with the article composition.

32. The method of claim 28, wherein an iron-based superalloy article is provided.

33. The method of claim 28, wherein a nickel-based superalloy article is provided.

34. The method of claim 28, wherein the non-oxidative atmosphere for resolutioning and stress relieving is selected from the group consisting of nitrogen, inert gas, and combinations thereof.

* * * * *

UNITED STATES PATENT AND TRADEMARK OFFICE
CERTIFICATE OF CORRECTION

PATENT NO.    : 6,927,361 B2
DATED         : August 9, 2005
INVENTOR(S)   : Kelly et al.

It is certified that error appears in the above-identified patent and that said Letters Patent is hereby corrected as shown below:

Column 7,
Line 49, "comprised of" should be -- each comprising --.

Column 9,
Line 14, "process of step" should be -- process of claim --.

Signed and Sealed this

Seventh Day of March, 2006

JON W. DUDAS
*Director of the United States Patent and Trademark Office*